US012695752B2

(12) United States Patent
Shoham et al.

(10) Patent No.: US 12,695,752 B2
(45) Date of Patent: Jul. 28, 2026

(54) DEVICE ATTRIBUTE DETERMINATION BASED ON PROTOCOL STRING CONVENTIONS

(71) Applicant: Armis Security Ltd., Tel Aviv-Jaffa (IL)

(72) Inventors: Ron Shoham, Tel Aviv (IL); Gil Ben Zvi, Hod Hasharon (IL); Tom Hanetz, Tel Aviv (IL); Yuval Friedlander, Petah-Tiqwa (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 1098 days.

(21) Appl. No.: 17/647,266

(22) Filed: Jan. 6, 2022

(65) Prior Publication Data

US 2023/0216853 A1     Jul. 6, 2023

(51) Int. Cl.
*G06N 3/04*          (2023.01)
*G06F 21/55*         (2013.01)
     (Continued)

(52) U.S. Cl.
CPC ............ *H04L 63/10* (2013.01); *G06F 21/554* (2013.01); *G06N 3/045* (2023.01); *G06N 3/047* (2023.01);
     (Continued)

(58) Field of Classification Search
CPC ......... H04L 63/10; G06N 3/047; G06N 3/045
See application file for complete search history.

(56) References Cited

U.S. PATENT DOCUMENTS 1,145,501 A     7/1915   More et al.
5,471,459 A    11/1995   Gut
                (Continued)

FOREIGN PATENT DOCUMENTS

AU      2019201137 A1    9/2019
CA       2326194 A1     8/2001
                (Continued)

OTHER PUBLICATIONS

Yu, Lingjing, et al. "You are what you broadcast: Identification of mobile and {IoT} devices from (public){WiFi}." 29th USENIX security symposium (USENIX security 20). 2020. (Year: 2020).*
                (Continued)

*Primary Examiner* — Hal Schnee
(74) *Attorney, Agent, or Firm* — HONIGMAN LLP

(57)          ABSTRACT
A system and method for determining device attributes based on protocol string conventions. A method includes applying at least one machine learning model to an application data set extracted based on at least one first pair of strings, each first pair of strings including a protocol string and a key string indicated in respective fields of communications session data corresponding to a device, wherein each machine learning model is trained based on a training data set including second pairs of strings device attribute labels, wherein each device attribute label corresponds to one of the second pairs of strings, wherein each of the at least one machine learning model is configured to output a predicted device attribute for the device based on the first pair of strings; and determining, based on the output of the at least one machine learning model, at least one device attribute of the device.

17 Claims, 5 Drawing Sheets

(51) Int. Cl.

| | |
|---|---|
| *G06N 3/045* | (2023.01) |
| *G06N 3/047* | (2023.01) |
| *G06N 3/08* | (2023.01) |
| *H04L 9/40* | (2022.01) |

(52) U.S. Cl.

CPC ......... *G06N 3/08* (2013.01); *G06F 2221/034*
(2013.01)

(56) References Cited

U.S. PATENT DOCUMENTS

| | | | |
|---|---|---|---|
| 6,363,489 | B1 | 3/2002 | Comay et al. |
| 6,754,321 | B1 | 6/2004 | Innes et al. |
| 7,165,240 | B2 | 1/2007 | Patterson |
| 7,346,338 | B1 | 3/2008 | Calhoun et al. |
| 7,499,998 | B2 | 3/2009 | Toebes et al. |
| 7,508,769 | B1 | 3/2009 | Duffield et al. |
| 7,512,980 | B2 | 3/2009 | Copeland et al. |
| 7,603,710 | B2 | 10/2009 | Harvey et al. |
| 7,620,533 | B2 | 11/2009 | Bolt et al. |
| 7,792,989 | B2 | 9/2010 | Toebes et al. |
| 7,836,079 | B2 | 11/2010 | Kumar et al. |
| 7,853,250 | B2 | 12/2010 | Harvey et al. |
| 7,921,462 | B2 | 4/2011 | Rooney et al. |
| 8,209,740 | B1 | 6/2012 | Kulaga et al. |
| 8,254,286 | B2 | 8/2012 | Nechushtan et al. |
| 8,307,430 | B1 | 11/2012 | Chen et al. |
| 8,392,496 | B2 | 3/2013 | Linden et al. |
| 8,434,148 | B2 | 4/2013 | Teo |
| 8,468,244 | B2 | 6/2013 | Redlich et al. |
| 8,468,606 | B2 | 6/2013 | Van et al. |
| 8,504,818 | B2 | 8/2013 | Rao et al. |
| 8,621,618 | B1 | 12/2013 | Ramsey et al. |
| 8,639,800 | B2 | 1/2014 | Friedrich et al. |
| 8,677,474 | B2 | 3/2014 | Bostrom et al. |
| 8,732,732 | B2 | 5/2014 | Meijer et al. |
| 8,744,987 | B1 | 6/2014 | Forman et al. |
| 8,767,630 | B1 | 7/2014 | Collins et al. |
| 8,836,536 | B2 | 9/2014 | Marwah et al. |
| 8,875,255 | B1 | 10/2014 | Dotan et al. |
| 8,972,539 | B2 | 3/2015 | Carriere |
| 9,027,079 | B2 | 5/2015 | Comay et al. |
| 9,031,087 | B2 | 5/2015 | Petrovykh |
| 9,106,714 | B2 | 8/2015 | Kumarasamy et al. |
| 9,135,293 | B1 | 9/2015 | Kienzle et al. |
| 9,149,199 | B2 | 10/2015 | Farazi |
| 9,154,516 | B1 | 10/2015 | Vaystikh et al. |
| 9,154,982 | B2 | 10/2015 | Chan et al. |
| 9,166,999 | B1 | 10/2015 | Kulkarni et al. |
| 9,231,918 | B2 | 1/2016 | Khan et al. |
| 9,253,282 | B2 | 2/2016 | O'Donoghue et al. |
| 9,306,965 | B1 | 4/2016 | Grossman et al. |
| 9,412,024 | B2 | 8/2016 | Chaudhury et al. |
| 9,456,343 | B1 | 9/2016 | Mihalache et al. |
| 9,503,463 | B2 | 11/2016 | Karta et al. |
| 9,516,053 | B1 | 12/2016 | Muddu et al. |
| 9,600,320 | B2 | 3/2017 | Hamilton et al. |
| 9,635,049 | B1 | 4/2017 | Oprea et al. |
| 9,692,775 | B2 | 6/2017 | Zhang |
| 9,749,349 | B1 | 8/2017 | Czarny et al. |
| 9,749,357 | B2 | 8/2017 | Bailey et al. |
| 9,754,112 | B1 | 9/2017 | Moritz et al. |
| 9,756,067 | B2 | 9/2017 | Boyadjiev et al. |
| 9,756,403 | B2 | 9/2017 | Proud |
| 9,894,093 | B2 | 2/2018 | Maestas |
| 9,978,038 | B2 | 5/2018 | Dhandapani et al. |
| 10,015,185 | B1 | 7/2018 | Kolman et al. |
| 10,045,218 | B1 | 8/2018 | Stapleton et al. |
| 10,063,434 | B1 | 8/2018 | Khanal et al. |
| 10,091,312 | B1 | 10/2018 | Khanwalkar et al. |
| 10,095,866 | B2 | 10/2018 | Gong et al. |
| 10,104,101 | B1 | 10/2018 | Thakar et al. |
| 10,187,369 | B2 | 1/2019 | Caldera et al. |
| 10,187,401 | B2 | 1/2019 | Machlica et al. |
| 10,291,635 | B2 | 5/2019 | Muddu et al. |
| 10,313,383 | B2 | 6/2019 | Sommer |
| 10,318,886 | B2 | 6/2019 | Baradaran et al. |
| 10,320,619 | B2 | 6/2019 | Seddigh et al. |
| 10,333,965 | B2 | 6/2019 | Gathala et al. |
| 10,333,988 | B2 | 6/2019 | Porras et al. |
| 10,380,348 | B2 | 8/2019 | Cheng et al. |
| 10,395,262 | B2 | 8/2019 | Faith et al. |
| 10,419,418 | B2 | 9/2019 | Grajek et al. |
| 10,419,931 | B1 | 9/2019 | Sohail et al. |
| 10,498,755 | B2 | 12/2019 | Harris et al. |
| 10,498,758 | B1 | 12/2019 | Schwartz et al. |
| 10,505,967 | B1 | 12/2019 | Schwartz et al. |
| 10,511,620 | B2 | 12/2019 | Schwartz et al. |
| 10,567,243 | B2 | 2/2020 | Tippenhauer et al. |
| 10,594,732 | B2 | 3/2020 | Amit et al. |
| 10,623,289 | B1 | 4/2020 | Mccorkendale et al. |
| 10,623,408 | B1 | 4/2020 | Marshall et al. |
| 10,623,426 | B1 | 4/2020 | Yumer et al. |
| 10,686,816 | B1 | 6/2020 | Shintre et al. |
| 10,699,018 | B2 | 6/2020 | Hamby |
| 10,708,291 | B2 | 7/2020 | Findlay |
| 10,735,456 | B2 | 8/2020 | Crabtree et al. |
| 10,771,498 | B1 | 9/2020 | Tamhane et al. |
| 10,831,994 | B2 | 11/2020 | Iyengar |
| 10,887,218 | B2 | 1/2021 | Williams et al. |
| 10,909,470 | B2 | 2/2021 | Pietrobon et al. |
| 10,924,503 | B1 | 2/2021 | Pereira et al. |
| 10,979,848 | B1 | 4/2021 | Palappetty et al. |
| 11,006,920 | B2 | 5/2021 | Shah |
| 11,050,679 | B1 | 6/2021 | Przygienda et al. |
| 11,057,393 | B2 | 7/2021 | Coffing |
| 11,074,508 | B2 | 7/2021 | Zhu et al. |
| 11,080,109 | B1 | 8/2021 | Poirel et al. |
| 11,102,082 | B1 | 8/2021 | Sarel et al. |
| 11,102,233 | B2 | 8/2021 | Schwartz et al. |
| 11,164,236 | B1 | 11/2021 | Ross et al. |
| 11,190,641 | B1 | 11/2021 | Shukla et al. |
| 11,240,064 | B2 | 2/2022 | Rubenstein et al. |
| 11,277,426 | B1 | 3/2022 | Kazemeyni |
| 11,363,031 | B2 | 6/2022 | Carnes et al. |
| 11,363,051 | B2 | 6/2022 | Izrael et al. |
| 11,399,023 | B2 | 7/2022 | Vasseur et al. |
| 11,455,501 | B2 | 9/2022 | Paula et al. |
| 11,481,503 | B2 | 10/2022 | Gitelman et al. |
| 11,489,847 | B1 | 11/2022 | Uplinger et al. |
| 11,496,391 | B1 | 11/2022 | Przygienda et al. |
| 11,526,392 | B2 | 12/2022 | Shoham et al. |
| 11,593,700 | B1 | 2/2023 | Ansari et al. |
| 11,755,586 | B2 | 9/2023 | Poirel et al. |
| 11,765,176 | B2 | 9/2023 | Viswanath et al. |
| 11,777,965 | B2 | 10/2023 | Du et al. |
| 11,824,877 | B2 | 11/2023 | Friedlander et al. |
| 11,824,880 | B2 | 11/2023 | Tomer et al. |
| 11,841,952 | B2 | 12/2023 | Gitelman et al. |
| 11,956,252 | B2 | 4/2024 | Gitelman et al. |
| 11,983,611 | B2 | 5/2024 | Hanetz et al. |
| 12,015,634 | B2 | 6/2024 | Izrael et al. |
| 12,026,248 | B2 | 7/2024 | Shoham et al. |
| 12,052,274 | B2 | 7/2024 | Friedlander et al. |
| 12,216,459 | B2 | 2/2025 | Friedlander et al. |
| 12,223,406 | B2 | 2/2025 | Hanetz et al. |
| 12,225,027 | B2 | 2/2025 | Luk-Zilberman et al. |
| 12,272,455 | B2 | 4/2025 | Bajwa et al. |
| 12,328,327 | B2 | 6/2025 | Friedlander et al. |
| 12,346,487 | B2 | 7/2025 | Luk-Zilberman et al. |
| 12,373,567 | B2 | 7/2025 | Gitelman et al. |
| 12,375,481 | B2 | 7/2025 | Sarel et al. |
| 12,381,896 | B2 | 8/2025 | Gitelman et al. |
| 12,386,947 | B2 | 8/2025 | Shoham et al. |
| 12,388,855 | B2 | 8/2025 | Friedlander et al. |
| 12,452,289 | B2 | 10/2025 | Izrael et al. |
| 12,470,593 | B2 | 11/2025 | Luk-Zilberman et al. |
| 2001/0048661 | A1 | 12/2001 | Clear et al. |
| 2002/0078381 | A1 | 6/2002 | Farley et al. |
| 2003/0187584 | A1 | 10/2003 | Harris |
| 2003/0217024 | A1 | 11/2003 | Kocher |
| 2004/0049699 | A1 | 3/2004 | Griffith et al. |
| 2004/0064480 | A1 | 4/2004 | Bartlett et al. |
| 2004/0123091 | A1 | 6/2004 | Das |

(56) References Cited

U.S. PATENT DOCUMENTS

| | | |
|---|---|---|
| 2005/0002025 A1 | 1/2005 | Goto et al. |
| 2005/0160480 A1 | 7/2005 | Birt et al. |
| 2005/0188215 A1 | 8/2005 | Shulman et al. |
| 2005/0188241 A1 | 8/2005 | Cabezas et al. |
| 2005/0198380 A1 | 9/2005 | Panasyuk et al. |
| 2005/0209519 A1 | 9/2005 | Krishnan et al. |
| 2006/0026273 A1 | 2/2006 | Comay et al. |
| 2006/0026682 A1 | 2/2006 | Zakas |
| 2006/0156402 A1 | 7/2006 | Stone et al. |
| 2006/0265746 A1 | 11/2006 | Farley et al. |
| 2007/0142030 A1 | 6/2007 | Sinha et al. |
| 2007/0209074 A1 | 9/2007 | Coffman |
| 2007/0209075 A1 | 9/2007 | Coffman |
| 2007/0288185 A1 | 12/2007 | Burch et al. |
| 2008/0039058 A1 | 2/2008 | Ray |
| 2008/0072285 A1 | 3/2008 | Sankaran et al. |
| 2008/0086776 A1 | 4/2008 | Tuvell et al. |
| 2008/0126286 A1 | 5/2008 | Machani |
| 2008/0200181 A1 | 8/2008 | Zill et al. |
| 2008/0271143 A1 | 10/2008 | Stephens et al. |
| 2008/0289027 A1 | 11/2008 | Yariv et al. |
| 2009/0138590 A1 | 5/2009 | Lee et al. |
| 2009/0172821 A1 | 7/2009 | Daira et al. |
| 2009/0235354 A1 | 9/2009 | Gray et al. |
| 2010/0023604 A1 | 1/2010 | Verma et al. |
| 2010/0081411 A1 | 4/2010 | Montenero |
| 2010/0125903 A1 | 5/2010 | Devarajan et al. |
| 2010/0274924 A1 | 10/2010 | Allan et al. |
| 2011/0046920 A1 | 2/2011 | Amis |
| 2011/0154497 A1 | 6/2011 | Bailey, Jr. |
| 2011/0251960 A1 | 10/2011 | Holla et al. |
| 2011/0258703 A1 | 10/2011 | Ramcharran |
| 2012/0072983 A1 | 3/2012 | Mccusker et al. |
| 2012/0096558 A1 | 4/2012 | Evrard |
| 2012/0150490 A1 | 6/2012 | Oyabu et al. |
| 2012/0185563 A1 | 7/2012 | Sugiyama et al. |
| 2012/0250325 A1 | 10/2012 | Oki |
| 2013/0011030 A1 | 1/2013 | Tzoumas et al. |
| 2013/0042029 A1 | 2/2013 | Lu et al. |
| 2013/0067582 A1 | 3/2013 | Donovan et al. |
| 2013/0074143 A1 | 3/2013 | Bu et al. |
| 2013/0096980 A1 | 4/2013 | Basavapatna et al. |
| 2013/0097699 A1 | 4/2013 | Balupari et al. |
| 2013/0097711 A1 | 4/2013 | Basavapatna et al. |
| 2013/0127618 A1 | 5/2013 | Sheleheda et al. |
| 2013/0167196 A1 | 6/2013 | Spencer et al. |
| 2013/0179988 A1 | 7/2013 | Bekker et al. |
| 2013/0191919 A1 | 7/2013 | Basavapatna et al. |
| 2013/0227689 A1 | 8/2013 | Pietrowicz et al. |
| 2013/0239177 A1 | 9/2013 | Sigurdson et al. |
| 2013/0246088 A1 | 9/2013 | Huster et al. |
| 2013/0247194 A1 | 9/2013 | Jha et al. |
| 2013/0298230 A1 | 11/2013 | Kumar et al. |
| 2013/0340084 A1 | 12/2013 | Schrecker et al. |
| 2014/0032650 A1 | 1/2014 | Singh et al. |
| 2014/0173738 A1 | 6/2014 | Condry et al. |
| 2014/0215195 A1 | 7/2014 | Colbert et al. |
| 2014/0237545 A1 | 8/2014 | Mylavarapu et al. |
| 2014/0241373 A1 | 8/2014 | Pasam et al. |
| 2014/0247728 A1 | 9/2014 | Amitai et al. |
| 2014/0270347 A1 | 9/2014 | Xu et al. |
| 2014/0282905 A1 | 9/2014 | Iyer et al. |
| 2014/0283029 A1 | 9/2014 | Chandrasekaran et al. |
| 2014/0317270 A1 | 10/2014 | Besehanic |
| 2015/0009995 A1 | 1/2015 | Gross et al. |
| 2015/0052595 A1 | 2/2015 | Murphy |
| 2015/0067865 A1 | 3/2015 | Seacat et al. |
| 2015/0113133 A1 | 4/2015 | Srinivas et al. |
| 2015/0128236 A1 | 5/2015 | Moscicki et al. |
| 2015/0128274 A1 | 5/2015 | Giokas |
| 2015/0163121 A1 | 6/2015 | Mahaffey et al. |
| 2015/0163242 A1 | 6/2015 | Laidlaw et al. |
| 2015/0199913 A1 | 7/2015 | Mayfield et al. |
| 2015/0200827 A1 | 7/2015 | Agarwal et al. |
| 2015/0207811 A1 | 7/2015 | Feher et al. |
| 2015/0229664 A1 | 8/2015 | Hawthorn et al. |
| 2015/0271200 A1 | 9/2015 | Brady et al. |
| 2015/0288744 A1 | 10/2015 | Dwan et al. |
| 2015/0295943 A1 | 10/2015 | Malachi |
| 2015/0326601 A1 | 11/2015 | Grondin et al. |
| 2015/0339912 A1 | 11/2015 | Farrand et al. |
| 2015/0346066 A1 | 12/2015 | Dutta et al. |
| 2015/0350228 A1 | 12/2015 | Baxley et al. |
| 2015/0350902 A1 | 12/2015 | Baxley et al. |
| 2015/0356421 A1 | 12/2015 | Jones et al. |
| 2015/0373043 A1 | 12/2015 | Wang et al. |
| 2015/0373483 A1 | 12/2015 | Verma et al. |
| 2015/0379371 A1 | 12/2015 | Yoon et al. |
| 2016/0044054 A1 | 2/2016 | Stiansen et al. |
| 2016/0050182 A1 | 2/2016 | Edross |
| 2016/0078229 A1 | 3/2016 | Gong et al. |
| 2016/0088000 A1 | 3/2016 | Siva Kumar et al. |
| 2016/0094578 A1 | 3/2016 | Mcquillan et al. |
| 2016/0099963 A1 | 4/2016 | Mahaffey et al. |
| 2016/0112878 A1 | 4/2016 | Kaushik |
| 2016/0127417 A1 | 5/2016 | Janssen |
| 2016/0127777 A1 | 5/2016 | Roberts et al. |
| 2016/0134588 A1 | 5/2016 | Falkowitz et al. |
| 2016/0173521 A1 | 6/2016 | Yampolskiy et al. |
| 2016/0191559 A1 | 6/2016 | Mhatre et al. |
| 2016/0203316 A1 | 7/2016 | Mace et al. |
| 2016/0219067 A1 | 7/2016 | Han et al. |
| 2016/0226911 A1 | 8/2016 | Boss et al. |
| 2016/0232358 A1 | 8/2016 | Grieco et al. |
| 2016/0253069 A1 | 9/2016 | Zapletal |
| 2016/0277427 A1 | 9/2016 | Deshpande et al. |
| 2016/0294854 A1 | 10/2016 | Parthasarathi et al. |
| 2016/0300266 A1 | 10/2016 | Smalley et al. |
| 2016/0308898 A1 | 10/2016 | Teeple et al. |
| 2016/0359872 A1 | 12/2016 | Yadav et al. |
| 2016/0359887 A1 | 12/2016 | Yadav et al. |
| 2016/0359915 A1 | 12/2016 | Gupta et al. |
| 2016/0366040 A1 | 12/2016 | Nampelly et al. |
| 2016/0366155 A1 | 12/2016 | El-Moussa et al. |
| 2016/0378993 A1 | 12/2016 | Mcgee et al. |
| 2016/0380989 A1 | 12/2016 | Bailey et al. |
| 2017/0034161 A1 | 2/2017 | Isola et al. |
| 2017/0046510 A1 | 2/2017 | Chen et al. |
| 2017/0046519 A1 | 2/2017 | Cam |
| 2017/0048270 A1 | 2/2017 | Boyadjiev et al. |
| 2017/0063906 A1 | 3/2017 | Muddu et al. |
| 2017/0063912 A1 | 3/2017 | Muddu et al. |
| 2017/0063922 A1 | 3/2017 | Ibatullin et al. |
| 2017/0070380 A1 | 3/2017 | Bajpai et al. |
| 2017/0070419 A1 | 3/2017 | Singhal et al. |
| 2017/0070517 A1 | 3/2017 | Bailey et al. |
| 2017/0070523 A1 | 3/2017 | Bailey et al. |
| 2017/0078322 A1 | 3/2017 | Seiver et al. |
| 2017/0083307 A1 | 3/2017 | Aleksandrov et al. |
| 2017/0084269 A1 | 3/2017 | Shi et al. |
| 2017/0090499 A1 | 3/2017 | Dolan |
| 2017/0111813 A1 | 4/2017 | Townend et al. |
| 2017/0124478 A1 | 5/2017 | Baradaran et al. |
| 2017/0150939 A1 | 6/2017 | Shah |
| 2017/0180384 A1 | 6/2017 | Malenfant et al. |
| 2017/0208079 A1 | 7/2017 | Cammarota et al. |
| 2017/0214701 A1 | 7/2017 | Hasan |
| 2017/0220801 A1 | 8/2017 | Stockdale et al. |
| 2017/0223037 A1 | 8/2017 | Singh et al. |
| 2017/0244746 A1 | 8/2017 | Hawthorn et al. |
| 2017/0250855 A1 | 8/2017 | Patil et al. |
| 2017/0250979 A1 | 8/2017 | Benson et al. |
| 2017/0257363 A1 | 9/2017 | Franke et al. |
| 2017/0264644 A1 | 9/2017 | Mihan et al. |
| 2017/0272460 A1 | 9/2017 | Rusakov et al. |
| 2017/0279829 A1 | 9/2017 | Vasseur et al. |
| 2017/0289187 A1 | 10/2017 | Noel et al. |
| 2017/0324651 A1 | 11/2017 | Penno et al. |
| 2017/0332238 A1 | 11/2017 | Bansal et al. |
| 2017/0339180 A1 | 11/2017 | Klein et al. |
| 2017/0353491 A1 | 12/2017 | Gukal et al. |
| 2017/0353498 A1 | 12/2017 | Huang et al. |
| 2017/0353499 A1 | 12/2017 | Huang et al. |
| 2017/0372232 A1 | 12/2017 | Maughan et al. |

(56) References Cited

U.S. PATENT DOCUMENTS

| | | |
|---|---|---|
| 2018/0004948 A1 | 1/2018 | Martin et al. |
| 2018/0032997 A1 | 2/2018 | Gordon et al. |
| 2018/0039789 A1 | 2/2018 | Sanchez |
| 2018/0048534 A1 | 2/2018 | Banga et al. |
| 2018/0048666 A1 | 2/2018 | Alderson |
| 2018/0054455 A1 | 2/2018 | Bercovich et al. |
| 2018/0096260 A1 | 4/2018 | Zimmer et al. |
| 2018/0097775 A1 | 4/2018 | Obaidi |
| 2018/0097840 A1 | 4/2018 | Murthy |
| 2018/0124091 A1 | 5/2018 | Sweeney et al. |
| 2018/0124093 A1 | 5/2018 | Schwartz et al. |
| 2018/0124096 A1 | 5/2018 | Schwartz et al. |
| 2018/0129663 A1 | 5/2018 | Ivanov et al. |
| 2018/0137287 A1 | 5/2018 | Han et al. |
| 2018/0144139 A1 | 5/2018 | Cheng et al. |
| 2018/0181749 A1 | 6/2018 | Kolacinski et al. |
| 2018/0191593 A1 | 7/2018 | De Knijf et al. |
| 2018/0198812 A1 | 7/2018 | Christodorescu et al. |
| 2018/0225592 A1 | 8/2018 | Ponnuswamy |
| 2018/0247312 A1 | 8/2018 | Loganathan et al. |
| 2018/0260214 A1 | 9/2018 | Oberheide et al. |
| 2018/0270229 A1 | 9/2018 | Zhang et al. |
| 2018/0288045 A1 | 10/2018 | Karunakaran et al. |
| 2018/0307943 A1 | 10/2018 | Savkli et al. |
| 2018/0309747 A1 | 10/2018 | Sweet et al. |
| 2018/0309766 A1 | 10/2018 | Marnfeldt |
| 2018/0324193 A1 | 11/2018 | Ronen et al. |
| 2018/0330257 A1 | 11/2018 | Dodson et al. |
| 2018/0332069 A1 | 11/2018 | Moore et al. |
| 2018/0351987 A1 | 12/2018 | Patel et al. |
| 2018/0359278 A1 | 12/2018 | Rusakov et al. |
| 2018/0365397 A1 | 12/2018 | Viscarola et al. |
| 2018/0367548 A1 | 12/2018 | Stokes et al. |
| 2019/0014137 A1 | 1/2019 | Du et al. |
| 2019/0020641 A1 | 1/2019 | Wasily et al. |
| 2019/0020670 A1 | 1/2019 | Brabec et al. |
| 2019/0034413 A1 | 1/2019 | Rosewell et al. |
| 2019/0036688 A1 | 1/2019 | Wasily et al. |
| 2019/0052554 A1 | 2/2019 | Mukerji et al. |
| 2019/0057378 A1 | 2/2019 | Rudnick et al. |
| 2019/0065736 A1 | 2/2019 | Dharmadhikari et al. |
| 2019/0075013 A1 | 3/2019 | Garcia et al. |
| 2019/0081922 A1 | 3/2019 | Vilenski et al. |
| 2019/0095587 A1 | 3/2019 | Warner et al. |
| 2019/0097907 A1 | 3/2019 | Nickolov et al. |
| 2019/0102361 A1 | 4/2019 | Muralidharan et al. |
| 2019/0102698 A1 | 4/2019 | Roberts et al. |
| 2019/0108443 A1 | 4/2019 | Dwarakanath et al. |
| 2019/0109820 A1 | 4/2019 | Clark et al. |
| 2019/0114360 A1 | 4/2019 | Garg et al. |
| 2019/0116193 A1 | 4/2019 | Wang et al. |
| 2019/0124045 A1 | 4/2019 | Zong et al. |
| 2019/0132205 A1 | 5/2019 | Du et al. |
| 2019/0132286 A1 | 5/2019 | Holla et al. |
| 2019/0132344 A1 | 5/2019 | Lem et al. |
| 2019/0140994 A1 | 5/2019 | Snider et al. |
| 2019/0156042 A1 | 5/2019 | Kim et al. |
| 2019/0156198 A1 | 5/2019 | Mars et al. |
| 2019/0163598 A1 | 5/2019 | Harutyunyan et al. |
| 2019/0166141 A1 | 5/2019 | Xu et al. |
| 2019/0166150 A1 | 5/2019 | Bulut et al. |
| 2019/0166502 A1 | 5/2019 | Chaskar |
| 2019/0180193 A1 | 6/2019 | Sinha et al. |
| 2019/0182278 A1 | 6/2019 | Das et al. |
| 2019/0190952 A1 | 6/2019 | Cherry |
| 2019/0215380 A1 | 7/2019 | Rykowski et al. |
| 2019/0215688 A1 | 7/2019 | Zavesky et al. |
| 2019/0216350 A1 | 7/2019 | Sullivan et al. |
| 2019/0217191 A1 | 7/2019 | Colenbrander |
| 2019/0238584 A1 | 8/2019 | Somasundaram et al. |
| 2019/0253455 A1 | 8/2019 | Xuan |
| 2019/0258807 A1 | 8/2019 | Dimaggio et al. |
| 2019/0258953 A1 | 8/2019 | Lang et al. |
| 2019/0260784 A1 | 8/2019 | Stockdale et al. |
| 2019/0260796 A1 | 8/2019 | Amine |
| 2019/0260804 A1 | 8/2019 | Beck et al. |
| 2019/0266323 A1 | 8/2019 | Nguyen et al. |
| 2019/0266324 A1 | 8/2019 | Edwards et al. |
| 2019/0268355 A1 | 8/2019 | Nisbet et al. |
| 2019/0268775 A1 | 8/2019 | Mcdaid et al. |
| 2019/0288852 A1 | 9/2019 | Shetye et al. |
| 2019/0294485 A1 | 9/2019 | Kukreja et al. |
| 2019/0295000 A1 | 9/2019 | Candel et al. |
| 2019/0297402 A1 | 9/2019 | Anderson et al. |
| 2019/0301979 A1 | 10/2019 | Kawanoue et al. |
| 2019/0303710 A1 | 10/2019 | Saha et al. |
| 2019/0306731 A1 | 10/2019 | Raghuramu et al. |
| 2019/0318100 A1 | 10/2019 | Bhatia et al. |
| 2019/0335405 A1 | 10/2019 | Wang |
| 2019/0362076 A1 | 11/2019 | Wang et al. |
| 2019/0372934 A1 | 12/2019 | Yehudai et al. |
| 2019/0379699 A1 | 12/2019 | Katragadda et al. |
| 2019/0380037 A1 | 12/2019 | Lifshitz et al. |
| 2019/0381242 A1 | 12/2019 | Ambrosina et al. |
| 2019/0392152 A1 | 12/2019 | Patel et al. |
| 2019/0392351 A1 | 12/2019 | Zuluaga et al. |
| 2020/0007436 A1 | 1/2020 | Williams et al. |
| 2020/0028862 A1 | 1/2020 | Lin et al. |
| 2020/0051697 A1 | 2/2020 | Krishnamurti et al. |
| 2020/0065710 A1 | 2/2020 | Range et al. |
| 2020/0074084 A1 | 3/2020 | Dorrans et al. |
| 2020/0076853 A1 | 3/2020 | Pandian et al. |
| 2020/0092312 A1 | 3/2020 | Caldwell et al. |
| 2020/0097651 A1 | 3/2020 | Mestha et al. |
| 2020/0106795 A1 | 4/2020 | Servajean et al. |
| 2020/0106803 A1 | 4/2020 | Schwartz et al. |
| 2020/0112571 A1 | 4/2020 | Koral et al. |
| 2020/0112584 A1 | 4/2020 | Schwartz et al. |
| 2020/0120144 A1 | 4/2020 | Yadav et al. |
| 2020/0134510 A1 | 4/2020 | Basel et al. |
| 2020/0137102 A1 | 4/2020 | Sheridan et al. |
| 2020/0143061 A1 | 5/2020 | Kim et al. |
| 2020/0145287 A1 | 5/2020 | Savalle et al. |
| 2020/0151616 A1 | 5/2020 | Mermoud et al. |
| 2020/0177613 A1 | 6/2020 | Nilangekar et al. |
| 2020/0193234 A1 | 6/2020 | Pai et al. |
| 2020/0195508 A1 | 6/2020 | Benjamin |
| 2020/0195669 A1 | 6/2020 | Karasaridis et al. |
| 2020/0195679 A1 | 6/2020 | Du |
| 2020/0201620 A1 | 6/2020 | Beard |
| 2020/0210592 A1 | 7/2020 | Karas et al. |
| 2020/0210871 A1 | 7/2020 | Alperovich et al. |
| 2020/0222010 A1 | 7/2020 | Howard |
| 2020/0226257 A1 | 7/2020 | Maimon et al. |
| 2020/0242488 A1* | 7/2020 | Medas ..................... G06N 5/01 |
| 2020/0242505 A1 | 7/2020 | Raz et al. |
| 2020/0244677 A1 | 7/2020 | Abbaszadeh et al. |
| 2020/0250530 A1 | 8/2020 | Shen |
| 2020/0272933 A1 | 8/2020 | Zhou |
| 2020/0280575 A1 | 9/2020 | Dean et al. |
| 2020/0285737 A1 | 9/2020 | Kraus et al. |
| 2020/0311557 A1 | 10/2020 | Jin et al. |
| 2020/0314134 A1 | 10/2020 | Izrael et al. |
| 2020/0322369 A1 | 10/2020 | Raghuramu et al. |
| 2020/0334228 A1 | 10/2020 | Matyska et al. |
| 2020/0364561 A1 | 11/2020 | Ananthanarayanan et al. |
| 2020/0364612 A1 | 11/2020 | Siravara et al. |
| 2020/0379868 A1 | 12/2020 | Dherange et al. |
| 2020/0382373 A1 | 12/2020 | Mermoud et al. |
| 2020/0382472 A1 | 12/2020 | Salin et al. |
| 2020/0382527 A1 | 12/2020 | Mitelman et al. |
| 2020/0382536 A1 | 12/2020 | Dherange et al. |
| 2020/0396129 A1 | 12/2020 | Tedaldi et al. |
| 2020/0403854 A1 | 12/2020 | Arunachalam et al. |
| 2020/0403991 A1 | 12/2020 | Sohail et al. |
| 2020/0409690 A1 | 12/2020 | Rouland et al. |
| 2020/0410403 A1 | 12/2020 | Kamulete |
| 2020/0412757 A1 | 12/2020 | Siddiq |
| 2021/0004409 A1 | 1/2021 | Zamora et al. |
| 2021/0029153 A1 | 1/2021 | Sugimoto et al. |
| 2021/0042570 A1 | 2/2021 | Iskandar et al. |
| 2021/0049270 A1 | 2/2021 | Urmanov et al. |
| 2021/0056404 A1 | 2/2021 | Goswami et al. |
| 2021/0058394 A1 | 2/2021 | Zhang et al. |

(56) References Cited

U.S. PATENT DOCUMENTS

| | | |
|---|---|---|
| 2021/0064593 A1 | 3/2021 | Yeddu |
| 2021/0065038 A1 | 3/2021 | Gu et al. |
| 2021/0067548 A1 | 3/2021 | Brandt et al. |
| 2021/0073658 A1 | 3/2021 | Poole et al. |
| 2021/0083983 A1 | 3/2021 | Chin et al. |
| 2021/0092094 A1 | 3/2021 | Kim et al. |
| 2021/0092095 A1 | 3/2021 | Kim et al. |
| 2021/0092117 A1 | 3/2021 | Zhang et al. |
| 2021/0092136 A1 | 3/2021 | Woodworth et al. |
| 2021/0097177 A1 | 4/2021 | Chistyakov et al. |
| 2021/0105613 A1 | 4/2021 | San et al. |
| 2021/0111990 A1 | 4/2021 | Nainar et al. |
| 2021/0112087 A1 | 4/2021 | Tassoumt et al. |
| 2021/0126931 A1 | 4/2021 | Babu et al. |
| 2021/0133346 A1 | 5/2021 | Alsharif et al. |
| 2021/0133538 A1* | 5/2021 | Troy .................... G06N 3/045 |
| 2021/0133602 A1 | 5/2021 | Amrani et al. |
| 2021/0160266 A1 | 5/2021 | Sternby et al. |
| 2021/0173760 A1 | 6/2021 | Downie et al. |
| 2021/0185058 A1 | 6/2021 | Gitelman et al. |
| 2021/0185083 A1 | 6/2021 | Azaria et al. |
| 2021/0203575 A1 | 7/2021 | Hanetz et al. |
| 2021/0203688 A1 | 7/2021 | Ghule et al. |
| 2021/0224687 A1 | 7/2021 | Goldszmidt et al. |
| 2021/0232291 A1 | 7/2021 | Abdulaal et al. |
| 2021/0250325 A1 | 8/2021 | Teflian et al. |
| 2021/0264035 A1 | 8/2021 | Gitelman et al. |
| 2021/0264036 A1 | 8/2021 | Gitelman et al. |
| 2021/0329029 A1* | 10/2021 | Vasseur ............... H04L 43/065 |
| 2021/0342207 A1 | 11/2021 | Oliveri et al. |
| 2021/0344695 A1* | 11/2021 | Palani .................. G06N 3/043 |
| 2021/0349774 A1 | 11/2021 | Shoham et al. |
| 2021/0365478 A1 | 11/2021 | Mopur et al. |
| 2021/0378577 A1 | 12/2021 | Sun et al. |
| 2021/0405984 A1 | 12/2021 | Agarwal et al. |
| 2022/0058347 A1 | 2/2022 | Singaraju et al. |
| 2022/0060449 A1 | 2/2022 | Head, Jr. et al. |
| 2022/0070183 A1 | 3/2022 | Goyal |
| 2022/0086071 A1 | 3/2022 | Sivaraman et al. |
| 2022/0086179 A1 | 3/2022 | Levin et al. |
| 2022/0138321 A1 | 5/2022 | Shrestha et al. |
| 2022/0138504 A1 | 5/2022 | Fathi et al. |
| 2022/0141178 A1 | 5/2022 | Suzuki |
| 2022/0150263 A1 | 5/2022 | Ricafort et al. |
| 2022/0150264 A1 | 5/2022 | Friedlander et al. |
| 2022/0188087 A1 | 6/2022 | Montag et al. |
| 2022/0191761 A1 | 6/2022 | Feng et al. |
| 2022/0210079 A1 | 6/2022 | Koren et al. |
| 2022/0210190 A1 | 6/2022 | Weber et al. |
| 2022/0231993 A1 | 7/2022 | Sharma et al. |
| 2022/0239682 A1 | 7/2022 | Ben Zvi et al. |
| 2022/0247786 A1 | 8/2022 | Vavilala et al. |
| 2022/0255960 A1 | 8/2022 | Fainberg et al. |
| 2022/0263853 A1 | 8/2022 | Izrael et al. |
| 2022/0276931 A1 | 9/2022 | Chen et al. |
| 2022/0278984 A1 | 9/2022 | Sarel et al. |
| 2022/0311789 A1 | 9/2022 | Luk-Zilberman et al. |
| 2022/0327219 A1 | 10/2022 | Choi et al. |
| 2022/0327221 A1 | 10/2022 | Gitelman et al. |
| 2022/0391300 A1 | 12/2022 | Trapani et al. |
| 2022/0398307 A1 | 12/2022 | Shoham et al. |
| 2022/0414230 A1 | 12/2022 | Gitelman et al. |
| 2023/0004856 A1 | 1/2023 | Shoham et al. |
| 2023/0004857 A1 | 1/2023 | Shoham et al. |
| 2023/0011129 A1 | 1/2023 | Wuhib et al. |
| 2023/0014556 A1 | 1/2023 | Schuler et al. |
| 2023/0088415 A1 | 3/2023 | Friedlander et al. |
| 2023/0090050 A1 | 3/2023 | Kellner et al. |
| 2023/0143024 A1 | 5/2023 | Friedlander et al. |
| 2023/0259802 A1 | 8/2023 | Klimov et al. |
| 2023/0300167 A1 | 9/2023 | Brecl |
| 2023/0306297 A1 | 9/2023 | Friedlander et al. |
| 2023/0336580 A1 | 10/2023 | Luk-Zilberman et al. |
| 2023/0344775 A1 | 10/2023 | Parekh et al. |
| 2023/0370334 A1 | 11/2023 | Mannengal et al. |
| 2023/0388106 A1 | 11/2023 | Craciun et al. |
| 2023/0394136 A1 | 12/2023 | Shoham et al. |
| 2023/0412626 A1 | 12/2023 | Wright |
| 2024/0015177 A1 | 1/2024 | Luk-Zilberman et al. |
| 2024/0078886 A1 | 3/2024 | Ghourchian et al. |
| 2024/0080299 A1 | 3/2024 | Kim |
| 2024/0089277 A1 | 3/2024 | Friedlander et al. |
| 2024/0102828 A1* | 3/2024 | Giaconi ................. G06Q 50/06 |
| 2024/0154984 A1 | 5/2024 | Friedlander et al. |
| 2024/0154995 A1 | 5/2024 | Schwartz et al. |
| 2024/0250967 A1 | 7/2024 | Gitelman et al. |
| 2024/0256979 A1 | 8/2024 | Hanetz et al. |
| 2024/0372562 A1 | 11/2024 | Cooper et al. |
| 2024/0414182 A1 | 12/2024 | Friedlander et al. |
| 2024/0414187 A1 | 12/2024 | Izrael et al. |
| 2025/0023887 A1 | 1/2025 | Bosch et al. |
| 2025/0036748 A1 | 1/2025 | Shoham et al. |
| 2025/0062777 A1 | 2/2025 | Cooper et al. |
| 2025/0133106 A1 | 4/2025 | Hasan |
| 2025/0205879 A1 | 6/2025 | Cristache |
| 2025/0231555 A1 | 7/2025 | Friedlander et al. |
| 2025/0232042 A1 | 7/2025 | Akoune et al. |
| 2025/0247391 A1 | 7/2025 | Ladelsky Lellouch et al. |
| 2025/0260703 A1 | 8/2025 | Luk-Zilberman et al. |
| 2025/0291622 A1 | 9/2025 | Kim et al. |
| 2025/0337762 A1 | 10/2025 | Keisar et al. |
| 2025/0384167 A1 | 12/2025 | Armis et al. |

FOREIGN PATENT DOCUMENTS

| | | |
|---|---|---|
| CN | 102833271 A | 12/2012 |
| CN | 103368979 A | 10/2013 |
| CN | 103812861 A | 5/2014 |
| CN | 103874069 A | 6/2014 |
| CN | 104426906 A | 3/2015 |
| CN | 104520871 A | 4/2015 |
| CN | 105554009 A | 5/2016 |
| CN | 106462531 A | 2/2017 |
| CN | 106846806 A | 6/2017 |
| CN | 107204869 A | 9/2017 |
| CN | 107609179 A | 1/2018 |
| CN | 107743108 A | 2/2018 |
| CN | 108632279 A | 10/2018 |
| CN | 108780479 A | 11/2018 |
| CN | 108885659 A | 11/2018 |
| CN | 108900476 A | 11/2018 |
| CN | 108985068 A | 12/2018 |
| CN | 109063745 A | 12/2018 |
| CN | 109246685 A | 1/2019 |
| CN | 110115015 A | 8/2019 |
| CN | 110502677 A | 11/2019 |
| CN | 110554961 A | 12/2019 |
| CN | 110583003 A | 12/2019 |
| CN | 110661759 A | 1/2020 |
| CN | 111091068 A | 5/2020 |
| CN | 107667505 B | 12/2020 |
| CN | 112019494 A | 12/2020 |
| CN | 112560045 A | 3/2021 |
| CN | 112802086 A | 5/2021 |
| CN | 114255830 A | 3/2022 |
| CN | 114270347 A | 4/2022 |
| EP | 3111614 A1 | 1/2017 |
| EP | 3154242 A1 | 4/2017 |
| EP | 3220595 A1 | 9/2017 |
| EP | 3349414 A1 | 7/2018 |
| EP | 3442164 A1 | 2/2019 |
| EP | 3451219 A1 | 3/2019 |
| EP | 3745291 A1 | 12/2020 |
| EP | 3896543 A1 | 10/2021 |
| EP | 3948600 A1 | 2/2022 |
| JP | 2012-222461 A | 11/2012 |
| JP | 5301669 B2 | 9/2013 |
| JP | 2018-521430 A | 8/2018 |
| JP | 2019-179395 A | 10/2019 |
| KR | 10-0974888 B1 | 8/2010 |
| RU | 124102 U1 | 1/2013 |
| RU | 2750554 C2 | 6/2021 |
| WO | 2013/075890 A1 | 5/2013 |
| WO | 2014/128253 A1 | 8/2014 |

(56)        References Cited

FOREIGN PATENT DOCUMENTS

| | | | |
|---|---|---|---|
| WO | 2015/113036 A1 | 7/2015 |
| WO | 2016/196820 A1 | 12/2016 |
| WO | 2017/127850 A1 | 7/2017 |
| WO | 2018/057945 A1 | 3/2018 |
| WO | 2018/071845 A1 | 4/2018 |
| WO | 2018/080975 A1 | 5/2018 |
| WO | 2018/080976 A1 | 5/2018 |
| WO | 2018/182442 A1 | 10/2018 |
| WO | 2018/213205 A1 | 11/2018 |
| WO | 2019/064237 A1 | 4/2019 |
| WO | 2019/164484 A1 | 8/2019 |
| WO | 2020/005258 A1 | 1/2020 |
| WO | 2020/093020 A1 | 5/2020 |
| WO | 2020/124037 A1 | 6/2020 |
| WO | 2020/136635 A1 | 7/2020 |
| WO | 2020/141486 A1 | 7/2020 |
| WO | 2020/205258 A1 | 10/2020 |
| WO | 2021/105995 A1 | 6/2021 |
| WO | 2022/103630 A1 | 5/2022 |

OTHER PUBLICATIONS

Cvitić, Ivan, et al. "Ensemble machine learning approach for classification of IoT devices in smart home." International Journal of Machine Learning and Cybernetics 12.11 (2021): 3179-3202. (Year: 2021).*

Feng, Wenbo, et al. "Network protocol recognition based on convolutional neural network." China Communications 17.4 (2020): 125-139. (Year: 2020).*

Kuncheva, Ludmila I., and Juan J. Rodríguez. "A weighted voting framework for classifiers ensembles." Knowledge and information systems 38.2 (2014): 259-275. (Year: 2014).*

Hamad, et al., "IoT device identification via network-flow based fingerprinting and learning," 18th IEEE International Conference on Trust, Security and Privacy in Computing and Communications, Aug. 2019.

Yu, et al., "You Are What You Broadcast: Identification of Mobile and IoT Devices from (Public) Wifi," USENIX Security Symposium, Aug. 2020, pp. 55-72.

International Search Report and Written Opinion from PCT/IL2023/050022, dated May 14, 2023, 10 pages.

Aechan Kim • Mohyun Park • Dong Hoon Lee: AI-IDS: Application of Deep Learning to Real-Time Web Intrusion Detection; IEEE Access (vol. 8, 2020, pp. 70245-70261); (Year: 2020).

Ajay Sreenivasulu, "Evaluation of cluster based anomaly detection", XP093293599, 2019, 28 pages.

Alsuwaidi et al., "Security Vulnerabilities Detected in Medical Devices", 12th Annual Undergraduate Research Conference on Applied Computing (URC2020), United Arab Emirates University, College of IT, Department of Information Systems and Security, 6 pages (Year: 2020).

Amin et al., "CADENCE: Conditional Anomaly Detection for Events Using Noise-Contrastive Estimation", Proceedings of the 12th ACM Workshop on Artificial Intelligence and Security, Nov. 11, 2019.

Andzinski et al. Anomaly detection in DNS traffic, Clustering-based approach, Nov. 5, 2019, https://www.icann.org/sites/default/files/packages/ids-2019/05-andzinski-anomaly-detection-in-dns-traffic-11may19-en.pdf.

Ang Cui et al., "When Firmware Modifications Attack: A Case Study of Embedded Exploitation", Jan. 1, 2013, XP055711221, DOI: 10.7916/D8P55NKB, Retrieved from the Internet: URL:https://web.archive.org/web/20150926051553if_/http://ids.cs.columbia.edu/sites/default/files/ndss-2013.pdf.

Anna L. Buczak • Erhan Guven; A Survey of Data Mining and Machine Learning Methods for Cyber Security Intrusion Detection; IEEE Communications Surveys & Tutorials (vol. 18, Issue: 2, 2016, pp. 1153-1176); (Year: 2016).

Anonymous authors. "Neural Networks with Block Diagonal Inner Product Layers". https://openreview.net/pdf?id=Hyl5ro0pW. 2018.

Anonymous: "Recovery", Nov. 20, 2019, pp. 1-16, XP093108397, Retrieved from the Internet on Dec. 4, 2024: URL: https://web.archive.org/web/20191120050356/https://hack-technicolor.readthedocs.io/en/stable/Recovery/.

ArcGIS for Desktop. "Overlay analysis" Accessed Jun. 30, 2021. https://desktop.arcgis.com/en/arcmap/10.3/analyze/commonly-used-tools/overlay-analysis.htm.

Breck, et al., "Data Validation for Machine Learning," MLSys, Dec. 31, 2019, retrieved from https://proceedings.misys.org/book/2019/file/5878a7ab84fb43402106c575658472fa- Paper.pdf.

Brokmeier, Pascal, "An Overview of Categorical Input Handling for Neural Networks", Towards Data Science, Jan. 15, 2019.

Chandola, et al., "Anomaly Detection: A Survey". ACM Computing Surveys, vol. 41, No. 3, Article 15, 2009, pp. 1-72.

Cieslak, D. A. et al., "Detecting Fractures in Classifier Performance", Data Mining, 2007, Icdm 2007, Seventh Ieee International Conference On, IEEE, Oct. 28, 2007, pp. 123-132.

Creager, "How can anomalous IoT device activity be detected?," Jul. 17, 2018, retrieved from https://www.techtarget.com/iotagenda/blog/IoT-Agenda/How-can-anomalous-IoT-device-activity-be-detected, 3 pages.

Daniel Minoli • Benedict Occhiogrosso; Current and Evolving Applications to Network Management; Wiley-IEEE Press 2023 (Edition : 1); (Year: 2023).

Daniel Wood, Cleartext Data Transmissions in Consumer IoT Medical Devices, IoT S&P'17, Nov. 3, 2017, Dallas, TX, USA, pp. 7-12 (Year: 2017).

David Zaldivar, Investigating the Security Threats on Networked Medical Devices, Published in: 2020 10th Annual Computing and Communication Workshop and Conference (CCWC), Date of Conference: Jan. 6-8, 2020, 6 pages (Year: 2020).

Deng et al., Sparse Support Vector Machine for Network Behavior Anomaly Detection, 2020 IEEE 8th International Conference on Information, Communication and Networks (ICICN) Year: 2020 | Conference Paper | Publisher: IEEE.

Dufka, "Comparison of Machine Learning Methods for Operating System Identification," Masaryk University Thesis, 2018, retrieved from https://is.muni.cz/th/wmu8d/thesis.pdf.

Emma McMahon, Assessing medical device vulnerabilities on the Internet of Things, Published in: 2017 IEEE International Conference on Intelligence and Security Informatics (ISI), Date of Conference: Jul. 22-24, 2017, 3 pages (Year: 2017).

File history and references cited therein of U.S. Appl. No. 17/932,163, filed Sep. 14, 2022, published Mar. 14, 2024, as U.S. Publication No. 20240089277A1.

File History and the references cited therein of U.S. Appl. No. 17/188,879, filed Mar. 1, 2021, published Sep. 1, 2022 as U.S. Publication No. US20220278984A1.

File history and the references cited therein of U.S. Appl. No. 16/715,464, filed Dec. 16, 2019, issued Apr. 9, 2024 as U.S. Pat. No. 11,956,252 B2.

File history and the references cited therein of U.S. Appl. No. 16/801,748, filed Feb. 26, 2020, issued Feb. 12, 2023 as U.S. Pat. No. 11,841,952 B2.

File history and the references cited therein of U.S. Appl. No. 17/821,914, filed Aug. 24, 2022, published Dec. 29, 2022 as U.S. Publication No. 2022-0414230 A1.

File history and the references cited therein of U.S. Appl. No. 18/597,947, filed Mar. 7, 2024, published Jul. 25, 2024 as U.S. Publication No. US20240250967A1.

Gama, J. et al., "Learning with Drift Detection" In: "Learning with Drift Detection", Jan. 1, 2004, XP055657564, vol. 3171, pp. 286-295.

Gnanaprakasam Pandian, Security Challenges of IoT and Medical Devicesin Healthcare, Book: Internet of Things, Edition: 1st Edition, 20 pages (Year: 2020).

Hagos et al., "A Machine Learning Based Tool for Passive OS Fingerprinting With TCP Variant" (Year: 2021).

Harisha Guna, Pankaj Kumar, Anshu Sinha; Cisco TAC Engineer(s). Cisco. "DHCP Parameter Request List Option 55 Used to Profile Endpoints Configuration Example" Updated: Feb. 3, 2021.

(56) References Cited

OTHER PUBLICATIONS

Hershey et al., Approximating the Kullback Leibler Divergence Between Gaussian Mixture Models, IBM T.J. Watson Research Center, IEEE 2007, pp. 317-320 (Year: 2007).

Ian Stine, A cyber risk scoring system for medical devices, International Journal of Critical Infrastructure Protection vol. 19, Dec. 2017, pp. 32-46 (Year: 2017).

International Preliminary Report on Patentability received for PCT Patent Application No. PCT/IL23/050022, mailed on Jul. 18, 2024, 7 pages.

Jake Beavers, Sina Pournouri, Recent Cyber Attacks and Vulnerabilities in Medical Devices and Healthcare Institutions, Apr. 9, 2019, Part of the Advanced Sciences and Technologies for Security Applications book series (ASTSA), https://link.springer.com/chapter/10.1007/978-3-030-11289-9_11 (Year: 2019).

Jibran Saleem; A state of the art survey—Impact of cyber aacks on SME's; ACM:2017; pp. 1-7.

Joao, G. et al., "On evaluating stream learning algorithms", Machine Learning, vol. 90, No. 3, Oct. 24, 2012, pp. 317-346.

Johnson, Daniel. "NLTK Tokenize: Words and Sentences Tokenizer with Example". Updated Mar. 8, 2022. https://www.guru99.com/tokenize-words-sentences-nltk.html.

Kumar, Ajitesh, "Machine Learning—Training, Validation & Test Data Set", retrieved on Jun. 31, 2021. Retrieved fromhttps://web.archive.org/web/20210728064012/https://vitalflux.com/machine-learning-training-validation-test-data-set/.

Lamba, et al., "Mitigating Cyber Security Threats of Industrial Control Systems (Scada & DCS)," International Journal for Technological Research in Engineering, 2017, pp. 31-34.

Li, Qianmu; Meng, Shunmei; Zhang, Sainan; Wu, Ming; Zhang, Jing; Ahvanooey, Milad Taleby; Aslam, Muhammad Shamrooz; Safety Risk Monitoring of Cyber-Physical Power Systems Based on Ensemble Learning Algorithm; IEEE Access (vol. 7, pp. 24788-24805); (Year: 2019).

Liu, et al., "Isolation Forest" 2008 Eight IEEE International Conference on Data Mining, 2009, pp. 413-422.

Markus, M., et al., "IoT Sentinel Demo: Automated Device-Type Identification for Security Enforcement in IoT", Proceedings Of The International Conference On Distributed Computing Systems, IEEE Computer Society, Jun. 5, 2017, pp. 2511-2514.

Martin, et al., "Decomposition of MAC Address Structure for Granular Device Inference," ACSAC, 2016, Los Angeles, CA, pp. 78-88.

Mohamed Abomhara; Cyber Security and the Internet of Things: Vulnerabilities, Threats, Intruders and Attacks; University of Agder, Norway; year: 2015; pp. 1-24.

Noguchi, Hirofumi, Misao Kataoka, and Yoji Yamato. "Device identification based on communication analysis for the internet of things." IEEE Access 7 (2019): 52903-52912. (Year: 2019).

Pandian, "Security Challenges of IoT and Medical Devices in Healthcare," Internet of Things, 1st Edition, 2020, Chapter 6, pp. 87-106.

Peltier Tech: Peltier Technical Services—Excel Charts and Programming. "Histogram With Normal Curve Overlay". Accessed Jun. 30, 2021. https://peltiertech.com/histogram-normal-curve-overlay/.

Peter J. Rousseeuw and Katrien Van Driessen. "A Fast Algorithm for the Minimum Covariance Determinant Estimator". Technometrics, 1999. pp. 212-223. vol. 41.3. U.S.

Rihan et al. Abnormal Network Traffic Detection based on Clustering and Classification Techniques: DoS Case Study, A Thesis Submitted in Partial Fulfillment of the Requirement for the Degree of Master in Information Technology https://library.iugaza.edu.ps/thesis/110094.pdf.

Faisal Alsubaei, "Security and Privacy in the Internet of Medical Things: Taxonomy and Risk Assessment", Published in: 2017 IEEE 42nd Conference on Local Computer Networks Workshops (LCN Workshops), Date of Conference: Oct. 9-9, 2017, 9 pages (Year: 2017).

File History and the references cited therein of corresponding U.S. Appl. No. 17/483,360, filed Sep. 23, 2021, issued Jul. 30, 2024 as U.S. Pat. No. 12,052,274 B2.

File History and the references cited therein of related U.S. Appl. No. 17/811,699, filed Jul. 11, 2022, published Jan. 11, 2024 as U.S. Publication No. 2024-0015177 A1.

Geethapriya Thamilarasu, "An Intrusion Detection System for Internet of Medical Things", Published in: IEEE Access (vol. 8) pp. 181560-181576, Date of Publication: Sep. 23, 2020 (Year: 2020).

Safi et al., "A Survey on IoT Profiling, Fingerprinting, and Identification", ACM Transactions on Internet of Things, Jan. 1, 1990, pp. 1-39.

Tahreem Yaqoob, Security Vulnerabilities, Attacks, Countermeasures, and Regulations of Networked Medical Devices—A Review, Published in: IEEE Communications Surveys & Tutorials (vol. 21, Issue: 4, Fourthquarter 2019), pp. 3723-3768, Date of Publication: Apr. 30, 2019 (Year: 2019).

Rohani, A., Taki, M., & Abdollahpour, M. (2018). A novel soft computing model (Gaussian process regression with K-fold cross validation) for daily and monthly solar radiation forecasting (Part: I). In Renewable Energy (vol. 115, pp. 411-422). Elsevier BV. https://doi.org/10.1016/j.renene.2017.08.061 (Year: 2017).

Scikit Learn. "3.3. Metrics and scoring: quantifying the quality of predictions" Accessed Jun. 6, 2021. https://scikit-learn.org/stable/modules/model_evaluation.html.

Seraphin B. Calo • Dinesh Verma • Maroun Touma • Franck Le • Douglas Freimuth • Erich Nahum; An AI Enabled System for Distributed System Characterization; 2019 IEEE International Conference on Cognitive Computing (ICCC) (2019, pp. 10-18); (Year: 2019).

Splunk Machine Learning Tool Kit User Guide. "Scoring metrics in the Machine Learning Toolkit" Accessed Jun. 30, 2021. https://docs.splunk.com/Documentation/MLApp/5.2.1/User/ScoreCommand.

Stack Overflow. "Overlay normal curve to histogram in R". Accessed 06.30.2021. https://stackoverflow.com/questions/20078107/overlay-normal-curve-to-histogram-in-r.

Tahreem Yaqoob, Haider Abbas, Security Vulnerabilities, Attacks, Countermeasures, and Regulations of Networked Medical Devices, IEEE Communications Surveys & Tutorials, vol. 21, No. 4, Fourth Quarter 2019, 46 pages (Year: 2019).

Tom Mahler, A New Methodology for Information Security Risk Assessment for Medical Devices and Its Evaluation, The Department of Software and Information Systems Engineering (SISE), Ben-Gurion University of the Negev, Israel, 24 pages (Year: 2020).

Travis' Blog random snippets and information. "Histogram with normal distribution overlay in Excel". Accessed Jun. 30, 2021. https://thydzik.com/histogram-with-normal-distribution-overlay-in-excel/.

Wazen M. Shbair et al "A Multi-Level Framework to Identify HTTPS Services". 2016 IEEE/IFIP Network Operations and Management Symposium (NOMS 2016).

Wenchao Cui and Minghao Gou "Design and Implementation of a SSH Proxy System Based on B/S Architecture" 2021 J. Phys.: Conf. Ser. 2010 012020.

Williams et al., "Cybersecurity vulnerabilities in medical devices: a complex environment and multifaceted problem", 2015, eHealth Research Group and Security Research Institute, Edith Cowan University, Perth, WA, Australia Correspondence: School of Computer and security (Year: 2015).

Xu, S.: "Politecnico Di Milano Machine Learning Techniques for Fault Detection in Chemical Processes, The Tennessee Eastman Process case study", Dec. 31, 2019.

Yu, et al., "Wdmti: wireless device manufacturer and type identification using hierarchical dirichlet process," 2018 IEEE 15th International Conference on Mobile Ad Hoc and Sensor Systems, pp. 19-27, Oct. 2018.

Zhang et al., "Network Anomaly Detection Based on Cooperative Semi-Supervised Support Vector Machine," 2019 International Conference on Networking and Network Applications (NaNA) Year: 2019 | Conference Paper | Publisher: IEEE.

Zhang, et al., "Active balancing mechanism for imbalanced medical data in deep learning-based classification models," ACM Transac-

(56)          References Cited

OTHER PUBLICATIONS tions on Multimedia Computing, Communications and Applications
(TOMM), Mar. 2020, retrieved from https://dl.acm.org/doi/pdf/10.
1145/3357253 (Year: 2020).

* cited by examiner

DEVICE ATTRIBUTE DETERMINATION BASED ON PROTOCOL STRING CONVENTIONS

TECHNICAL FIELD

The present disclosure relates generally to cybersecurity for network environments, and more specifically to using device attributes determined based on protocol string conventions in order to improve cybersecurity for a network environment.

BACKGROUND

Cybersecurity is the protection of information systems from theft or damage to the hardware, to the software, and to the information stored in them, as well as from disruption or misdirection of the services such systems provide. Cybersecurity is now a major concern for virtually any organization, from business enterprises to government institutions. Hackers and other attackers attempt to exploit any vulnerability in the infrastructure, hardware, or software of the organization to execute a cyber-attack. There are additional cybersecurity challenges due to high demand for employees or other users of network systems to bring their own devices, the dangers of which may not be easily recognizable.

To protect networked systems against malicious entities accessing the network, some existing solutions attempt to profile devices accessing the network. Such profiling may be helpful for detecting anomalous activity and for determining which cybersecurity mitigation actions are needed for activity of a given device. Providing accurate profiling is a critical challenge to ensuring that appropriate mitigation actions are taken.

The challenge involved with profiling a user device is magnified by the fact there is no industry standard for querying and/or obtaining information from user devices. This challenge is particularly relevant when attempting to determine device attributes. As new types of devices come out frequently and there is not a single uniform standard for determining device attributes in data sent from these devices, identifying the attributes of devices accessing a network environment is virtually impossible.

More specifically, as device data is obtained from various sources, device attributes such as device attribute may be absent or conflicting in data from the various sources. For example, this may be caused by partial visibility over network traffic data due to deployment considerations, partial coverage due to sampled traffic data as opposed to continuously collected traffic data, continuous and incremental collection of device data over time, and conflicting data coming from different sources.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for determining device attributes based on protocol string conventions. The method comprises: applying at least one machine learning model to an application data set extracted based on at least one first pair of strings, each first pair of strings including a protocol string and a key string indicated in respective fields of communications session data corresponding to a device, wherein each of the at least one machine learning model is trained based on a training data set including a plurality of second pairs of strings and a plurality of device attribute labels, wherein each device attribute label corresponds to one of the second pairs of strings, wherein each of the at least one machine learning model is configured to output a predicted device attribute for the device based on the first pair of strings; and determining, based on the output of the at least one machine learning model, at least one device attribute of the device.

Certain embodiments disclosed herein also include a non-transitory computer readable medium having stored thereon causing a processing circuitry to execute a process, the process comprising: applying at least one machine learning model to an application data set extracted based on at least one first pair of strings, each first pair of strings including a protocol string and a key string indicated in respective fields of communications session data corresponding to a device, wherein each of the at least one machine learning model is trained based on a training data set including a plurality of second pairs of strings and a plurality of device attribute labels, wherein each device attribute label corresponds to one of the second pairs of strings, wherein each of the at least one machine learning model is configured to output a predicted device attribute for the device based on the first pair of strings; and determining, based on the output of the at least one machine learning model, at least one device attribute of the device.

Certain embodiments disclosed herein also include a system for determining device attributes based on protocol string conventions. The system comprises: a processing circuitry; and a memory, the memory containing instructions that, when executed by the processing circuitry, configure the system to: apply at least one machine learning model to an application data set extracted based on at least one first pair of strings, each first pair of strings including a protocol string and a key string indicated in respective fields of communications session data corresponding to a device, wherein each of the at least one machine learning model is trained based on a training data set including a plurality of second pairs of strings and a plurality of device attribute labels, wherein each device attribute label corresponds to one of the second pairs of strings, wherein each of the at least one machine learning model is configured to output a predicted device attribute for the device based on the first pair of strings; and determine, based on the output of the at least one machine learning model, at least one device attribute of the device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
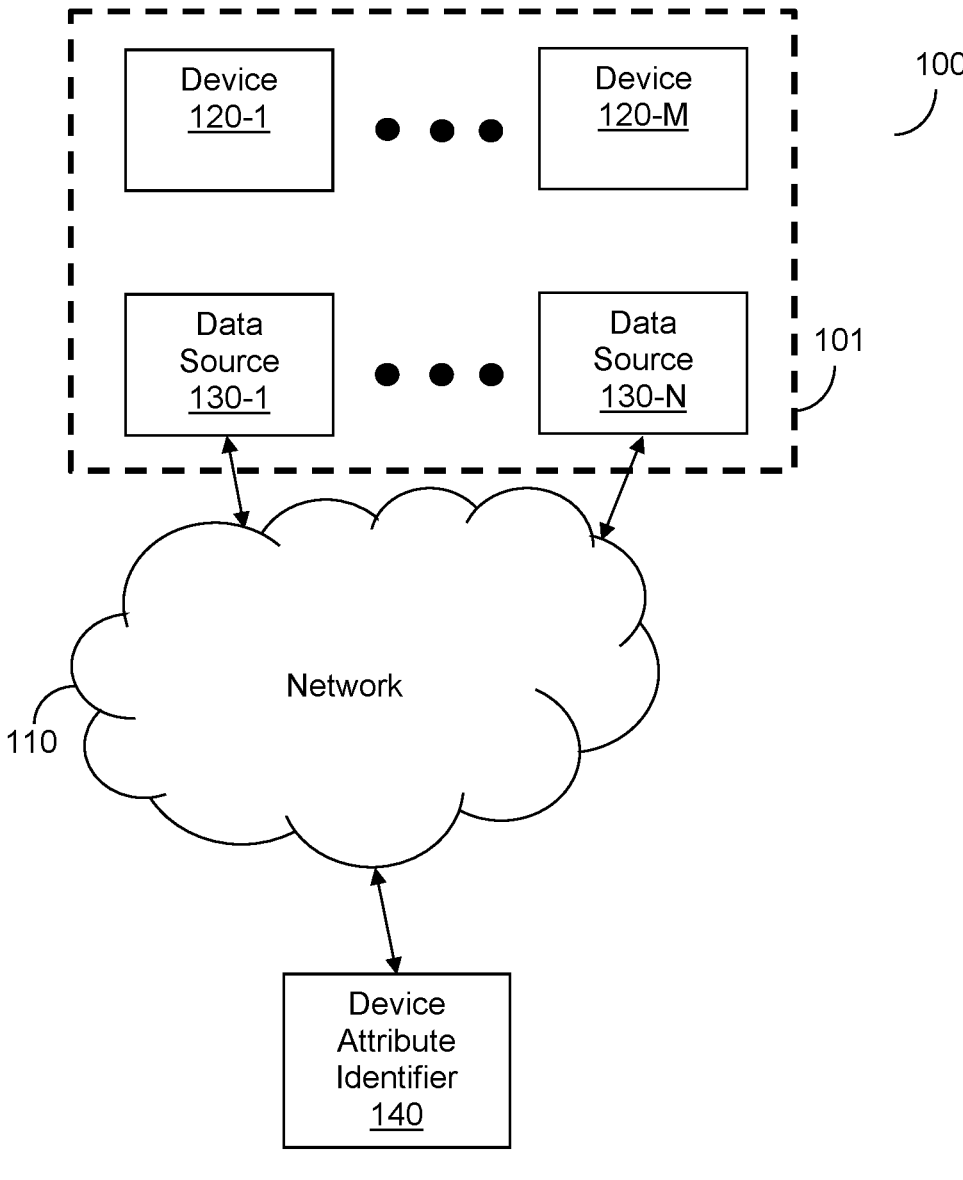
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that device attributes such as device type and operating system can be determined with a relatively high degree of accuracy based on data from Internet Protocol (IP) sessions and, in particular, IP sessions over unencrypted protocols. Data sent during an IP session includes protocol strings containing metadata used for communicating between systems during the session. Unencrypted IP session data is commonly available to cybersecurity tools and often demonstrates patterns which correlate to specific device attributes. For example, common prefixes, keys for device models, operating system versions, and the like, may be correlated to specific device attributes. Further, protocol strings sent during these IP sessions are typically sent in a structure that can be represented as protocol-key pairs which demonstrate certain patterns that can be used to accurately predict device attributes.

It has been further identified that patterns in protocol strings may be learned via machine learning in order to consistently and accurately determine types of devices by matching patterns in sent data to learned patterns with respect to protocol string conventions. A protocol string convention defines a format for strings sent during an IP session according to a particular protocol such that data sent using that protocol includes protocol strings indicating at least the protocol used to send the strings as well as a key to be used during communications with the device. These strings, in turn, may be included in respective fields of data sent by a device in accordance with the protocol string convention.

Machine learning provides a more objective process for identifying patterns in protocol strings than would be possible for human operators subjectively evaluating whether protocol strings are "similar" in ways that reflect a common convention. Additionally, using machine learning as described herein provides more accurate predictions of device attribute without requiring manual definition, tuning, or maintenance of protocol string conventions by a human operator, thereby allowing for effectively automating the process of device attribute identification.

It has also been identified that neural networks may provide a suitable mechanism by which patterns among protocol strings can be detected and analyzed. The disclosed embodiments provide improvements to such neural network architectures which allow them to process protocol strings in a manner allow for providing improved accuracy protocol string convention identifications. Accordingly, the disclosed embodiments provide designs, configurations, and arrangements of neural networks that further improve device attribute identification.

The disclosed embodiments utilize neural networks to learn and then subsequently identify device attributes based on conventions of protocol strings sent during IP sessions. The neural network includes an inner product layer which further improves accuracy of the device attribute identification and distinguishes among inputs with respect to characters making up strings among the device data.

A training data set is created by obtaining protocol strings fetched from one or more sources and labeling pairs of the protocol strings with corresponding device attribute labels. One or more neural networks is trained, in a supervised machine learning process, using a labeled training data set which includes the pairs of protocol strings and corresponding device attribute labels. Each neural network is trained such that it outputs a vector of probabilities for each label among the training data set based on input protocol string pairs. In various embodiments, an ensemble of neural networks may be trained for each protocol-key combination.

Once the neural networks have been trained, the neural networks are applied to an application data set including features extracted from protocol strings sent during IP sessions. The output layer of each neural network outputs a vector of probabilities for each label representing the probability that the label (and, therefore, the device attribute that label represents) matches a given protocol-key pair of strings (i.e., a pair of strings including a string indicating a protocol and a string indicating a key). Based on the output vectors, a corresponding device attribute is determined for each protocol string pair. In some embodiments, a threshold number of the neural networks must output probabilities indicating the same device attribute before that device attribute is determined for a given device based on protocol strings sent by that device during an IP session.

The disclosed embodiments further provide techniques for securing network environments that utilize device attributes identified with respect to protocol string conventions. Using device attributes identified as described herein, the network environment may be secured automatically and in real-time. To this end, in some embodiments, a policy may be implemented which defines permissible activity for different types of devices. If actions performed by a device which violate the policy are detected, mitigation actions may be performed in order to secure a network environment in which the device is operating.

FIG. 1 shows an example network diagram 100 utilized to describe the various disclosed embodiments. In the example network diagram 100, data sources 130-1 through 130-N (hereinafter referred to as a data source 130 or as data sources 130) communicate with a device attribute identifier 140 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The data sources 130 are deployed such that they can receive data from systems deployed in a network environment 101 in which devices 120-1 through 120-M (referred to as a device 120 or as devices 120) are deployed and communicate with each other, the data sources 130, other systems (not shown), combinations thereof, and the like. The data sources 130 may be, but are not limited to, databases, network scanners, both, and the like. Data collected by or in the data sources 130 may be transmitted to the device attribute identifier 140 for use in determining device attributes as described herein. To this end, such data includes protocol strings indicating at least protocols used to send the strings and keys for encrypting data pursuant to an IP session in which the strings are sent.

Each of the devices 120 may be, but is not limited to, a personal computer, a laptop, a tablet computer, a smartphone, a wearable computing device, or any other device capable of receiving and displaying notifications. Each device 120 may utilize a communications protocol which may be indicated in data transmitted by the device 120 such that communications by the device 120 are formatted in accordance with string conventions defined by that protocol. As discussed herein, such protocols define requirements for inclusion of protocol and key data which may be utilized to determine device attributes for each of the devices 120.

The device attribute identifier 140 is configured to apply machine learning techniques as described herein in order to determine device attributes of the devices 120 based on respective pairs of protocol strings indicated in the data obtained from the data sources 130. More specifically, the device attribute identifier 140 is configured to apply one or more neural networks, each including an inner product layer with nodes representing characters encoded according to an encoding standard such as, but not limited to, American Standard Code for Information Interchange (ASCII). The neural networks may be, but are not limited to, convolutional neural networks (CNNs).

During a training phase, the neural networks are trained based on training data including input pairs of protocol strings and labels indicating known device attributes of devices sending the respective pairs of protocol strings during historical IP sessions. Such known device attributes may include, but are not limited to, known types of devices, known operating system types or versions, and the like. Accordingly, each neural network is trained to output a probability that each known device attribute is appropriate for a given protocol string pair. In some embodiments, an ensemble of neural networks is trained and utilized in order to provide more stable predictions. More specifically, in an embodiment, when a neural network ensemble is utilized, a threshold number of neural networks of the ensemble must output the same device attribute in order for that device attribute to be determined as appropriate for a device. In a further embodiment, a device attribute may only be determined as appropriate for a device if there are also no conflicting predictions for the device attribute. In such an embodiment, the device attribute is not determined to be appropriate for a device even when a threshold number of neural networks output that device attribute if there are any conflicting predictions for the device attribute. As a result, inaccurate predictions of device attributes due to bias and other factors which may affect accuracy are mitigated.

It should be noted that the device attribute identifier 140 is depicted as being deployed outside of the network environment 101 and the data sources 130 are depicted as being deployed in the network environment 101, but that these depictions do not necessarily limit any particular embodiments disclosed herein. For example, the device attribute identifier 140 may be deployed in the network environment

101, the data sources 130 may be deployed outside of the network environment 101, or both.

Figure 2:
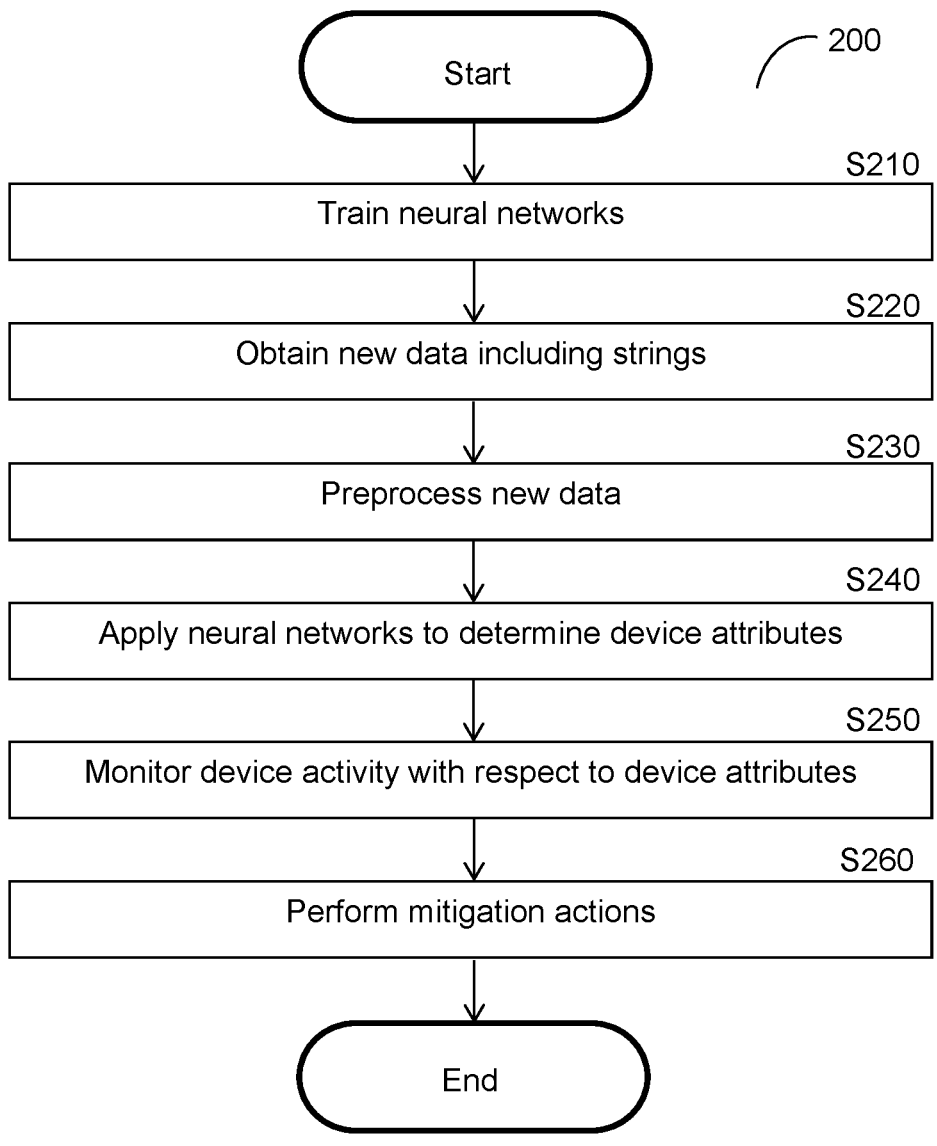
FIG. 2 is a flowchart illustrating a method for securing a network environment by determining device attributes based on protocol string conventions according to an embodiment.

FIG. 2 is a flowchart 200 illustrating a method for securing a network environment by determining device attributes based on protocol string conventions according to an embodiment. In an embodiment, the method is performed by the device attribute identifier 140, FIG. 1.

At S210, one or more neural networks are trained to yield predictions of device attributes based on pairs of protocol strings sent by devices during communication sessions such as Internet Protocol (IP) sessions. In an embodiment, the neural networks are trained using a supervised learning process based on a training data set including protocol-key pairs from IP sessions data and corresponding device attribute labels. Each protocol-key pair is a pair of strings including a string indicating a protocol value and a string indicating a key value. In another embodiment, an ensemble of neural networks is trained with respect to each device attribute label. Each neural network of the ensemble, when applied to subsequent application data, outputs a respective prediction of the device attribute. The results from the neural networks may be compared such that, for example, a threshold number of neural networks of the ensemble must output the same device attribute in order for that device attribute to be identified.

Figure 3:
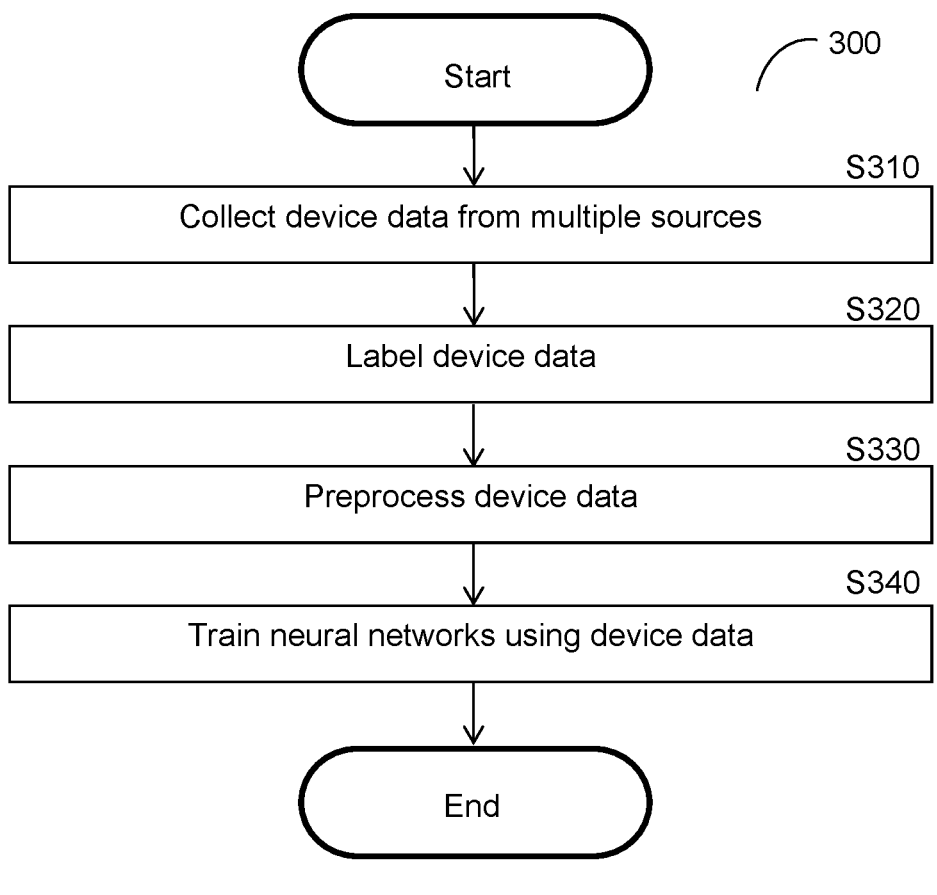
FIG. 3 is a flowchart illustrating a method for training a neural network to determine device attributes based on protocol string conventions according to an embodiment.

The process of training the neural networks is now described with respect to FIG. 3. FIG. 3 is a flowchart S210 illustrating a method for training a neural network to identify device attributes based on protocol string conventions according to an embodiment.

At S310, protocol strings indicated in communications sessions data are collected from one or more sources. Such sources may include, but are not limited to, network devices used for integration by different management and monitoring platforms, devices using different network protocols (e.g., DHCP, KERBEROS, SPOOLSS, SNMP, etc.), combinations thereof, and the like. Each protocol string indicates information used for communications by or with a respective device during a communications session such as, but not limited to, an indicator of a protocol used for communications by the device during the communications session, keys to be used for communicating with the device during the communications session, and the like.

At S320, pairs of the collected protocol strings are labeled. In an embodiment, S320 includes grouping strings sent in the same communication into pairs, sending the pairs to an operator (e.g., via a user interface), and receiving user inputs indicating the device attribute corresponding to each protocol string pair.

At optional S330, the protocol strings may be preprocessed. In an embodiment, S330 includes converting at least some of the protocol strings into encoded values from alphabetical values. As a non-limiting example, a string including alphabetical values may be converted into a set of ASCII values.

At S340, one or more neural networks are trained based on the labeled protocol string pairs. Each neural network is trained to predict a device attribute based on inputs including protocol string pairs.

In an embodiment, the training is performed iteratively in order to find optimal weights for the neural network. In a further embodiment, at each iteration, a random subset of devices (e.g., as represented by a randomly selected subset of device names among device names in the device name data) with known device attributes (e.g., device attributes indicated by respective labels) are shuffled and utilized to generate predictions and corresponding probabilities. An error function (e.g., a Cross-Entropy error function) is utilized to calculate the average error in order to determine the gradient and update the weights accordingly. One or more respective thresholds is calculated for each neural network based on its precision and recall performance with respect to each predicted device attribute.

In an example implementation, each neural network may be configured to classify devices with respect to device attributes, and the calculated thresholds for each neural network include multiple thresholds each corresponding to a respective label used by the neural network. In some implementations, each neural network may be trained to output an "indeterminate" device attribute or otherwise provide an output indicating that a device attribute could not be identified if none of the outputs with respect to any of the potential labels is above the respective threshold for that label.

In an embodiment, some or all of the neural networks are arranged as one or more ensembles each including multiple neural networks. Each ensemble corresponds to a respective device attribute (i.e., a device attribute represented by one of the device attribute labels). In this regard, it is noted that the randomized nature of a training process used by neural networks (e.g., randomized splitting of data into batches, randomized initialization of the model weights, etc.) tends to create inconsistencies in resulting model predictions. Using an ensemble of neural networks allows for mitigating bias which might be caused by any given randomization.

Returning to FIG. 2, at S220, new data to which the neural networks should be applied is obtained. The new data includes IP sessions data related to a device interacting in a communications session such as an IP session. The IP sessions data at least includes protocol strings sent by the device which indicate a protocol used by the device during the IP session as well as a key to be used for communications with the device during the IP session.

At S230, the new data is preprocessed. In an embodiment, S230 includes extracting features to which the neural networks will be applied. The extracted features at least include protocol-key pairs derived from the protocol strings.

In an embodiment, S230 includes filtering out strings outside of a predetermined length range (e.g., between 3 and 20 characters). The predetermined length range may differ for different protocol-key pairs.

In an embodiment, S230 further includes converting protocol strings into encoded values from alphabetical values. As a non-limiting example, text indicating a protocol including alphabetical values may be converted into a set of ASCII values. In an example implementation, the inputs to the neural network are vectors representing respective characters of a string. When the string is converted into ASCII values, such an input vector may include various values corresponding to respective characters of the ASCII encoding scheme, with each value being either 0 (i.e., the vector does not represent that character) or 1 (i.e., the vector represents that character).

An example preprocessing of data is described further below with respect to the preprocessing stage 410 of the neural network diagram 400.

At S240, the neural networks are applied to at least a portion of the new data in order to determine a device attribute for one or more devices represented in the new data.

In an embodiment, each neural network has at least two layers: a convolutional layer and a fully connected layer. The convolutional layer applies filters to input data in order to output a feature map including values representing a degree of similarity between a portion of the input data and one of the filters. The feature map is input to the fully connected layer, which is configured to perform linear transformation using matrix multiplication and to apply an activation function. In a further embodiment, the output of each neural network is a probability vector indicating a probability for each potential label (i.e., for different known device attributes). In some embodiments, the device attribute represented by the label having the highest probability is output by the neural network as the device attribute for a device.

In a further embodiment, S240 includes determining a device attribute based on the outputs of multiple neural networks which constitute a neural network ensemble. In some embodiments, a device attribute is only identified for the device if at least a predetermined threshold number or proportion of the neural networks output that device attribute. Requiring multiple neural networks to output the same device attribute before determining that device attribute as appropriate for a given device prevents bias or other inaccuracies in one neural network from affecting the accuracy of the overall ensemble.

At optional S250, device activity of the devices indicated in the new data is monitored with respect to the respective identified device attribute. In an embodiment, one or more policies define allowable behavior for devices for different types of devices such that, when a device having a certain device attribute deviates from the behavior indicated in the policy for that device attribute, the device's current behavior can be detected as abnormal and potentially requiring mitigation.

At optional S260, mitigation actions are performed with respect to one or more devices based on the device attributes identified for those devices. The mitigation actions may include, but are not limited to, severing communications between a device and one or more other devices or networks, generating an alert, sending a notification (e.g., to an administrator of a network environment), restricting access by the device, blocking devices (e.g., by adding such devices to a blacklist), combinations thereof, and the like. In some embodiments, devices having certain device attributes may be blacklisted such that devices having those device attributes are disallowed, and the mitigation actions may include blocking or severing communications with devices having the blacklisted device attributes.

Figure 4:
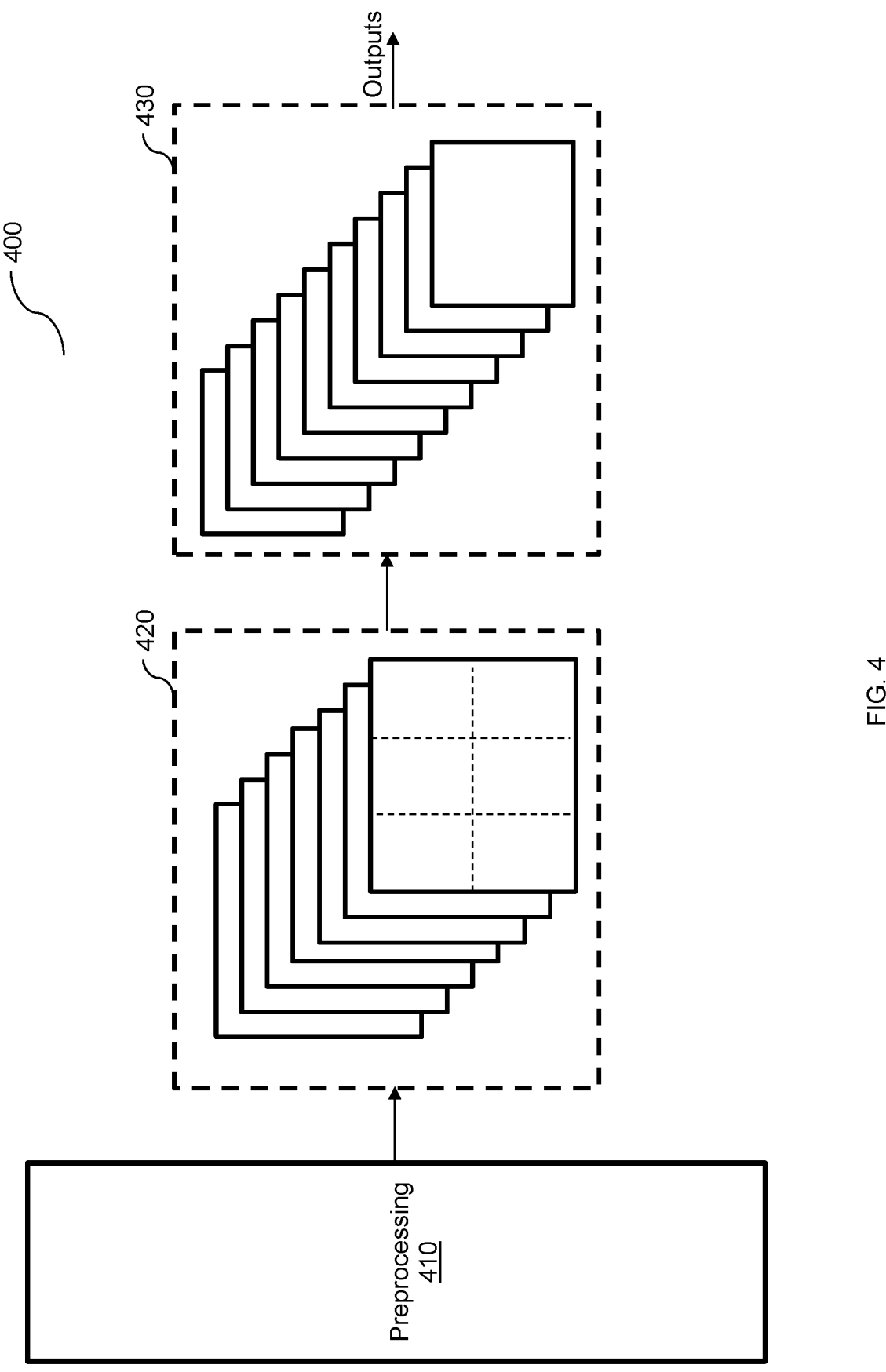
FIG. 4 is a neural network diagram illustrating a neural network used according to an embodiment.

FIG. 4 is a neural network diagram 400 illustrating a neural network used according to an embodiment.

As shown in FIG. 4, the neural network diagram 400 depicts a preprocessing stage 410 followed by processing via a two-layer convolutional neural network including a convolutional layer 420 and a fully connected layer 430. The input to the preprocessing stage 410 is a pair of strings of characters in particular fields in data transmitted by a device. More specifically, in an embodiment, each input pair of strings includes a protocol-key combination of strings.

In an embodiment, at the preprocessing stage 410, strings of the input pairs of strings are transformed into a set of vectors such as, but not limited to, one-hot vectors. Each vector represents a character (e.g., an ASCII character), and has multiple entries. Each entry of the vector represents a character, and one of the entries is marked (e.g., via including a 1 value instead of a 0 value) to indicate which character the vector represents.

In an embodiment, the vectors created via the preprocessing stage 410 are input to the convolutional layer 420. In an example implementation, the convolutional layer 420 has 7 filters of size 6 each. Each filter is a two-dimensional array of weights such that each of the 7 filters includes 6 weights. Each filter is applied to substrings of the string of characters and, in an example implementation, each such substring includes 6 characters from among the string of characters. The output of the convolutional layer 420 is a feature map including values for each substring of the string of characters. Each value represents a degree of similarity between one of the filters and the substring. A discretization process such as max-pooling may be utilized to choose a maximum value from among the values output by the filters.

In an embodiment, the output of the convolutional layer 420 is input to the fully connected layer 430. In some embodiments, the fully connected layer 430 includes nodes configured to perform linear transformation using matrix multiplication as well as an activation function (e.g., the soft-max activation function). In a further embodiment, the output of the convolutional neural network is a probability vector including one entry for each potential label, where each entry indicates the probability that a string of characters belongs to that label and each potential label represents a distinct value or category for a respective device attribute (i.e., the device attribute handled by the convolutional neural network).

In an embodiment, when multiple probability vectors may be output for a given device (e.g., a device that sent data including multiple keys), the multiple probability vectors generated for a device are aggregated into a single prediction for the device. In a further embodiment, the aggregation may be based on weighted values for each key string.

The convolutional neural network described above allows for generating predictions of device attributes based on device protocol string conventions as well as for providing explanations regarding patterns on which the predictions are based.

It should be noted that the neural network diagram 400 depicts a shallow neural network including only 2 layers merely for simplicity purposes, and that deeper neural networks including more layers may be utilized without departing from at least some disclosed embodiments. In other embodiments, a shallow neural network is utilized to avoid overfitting and to optimize training and application of the neural network with respect to the tradeoffs between accuracy of results and time and processing power required for machine learning functions.

It should also be noted that particular numbers of nodes are depicted in FIG. 4 merely for simplicity purposes, but that the number of nodes utilized are not limited to the numbers of nodes shown in FIG. 4.

Figure 5:
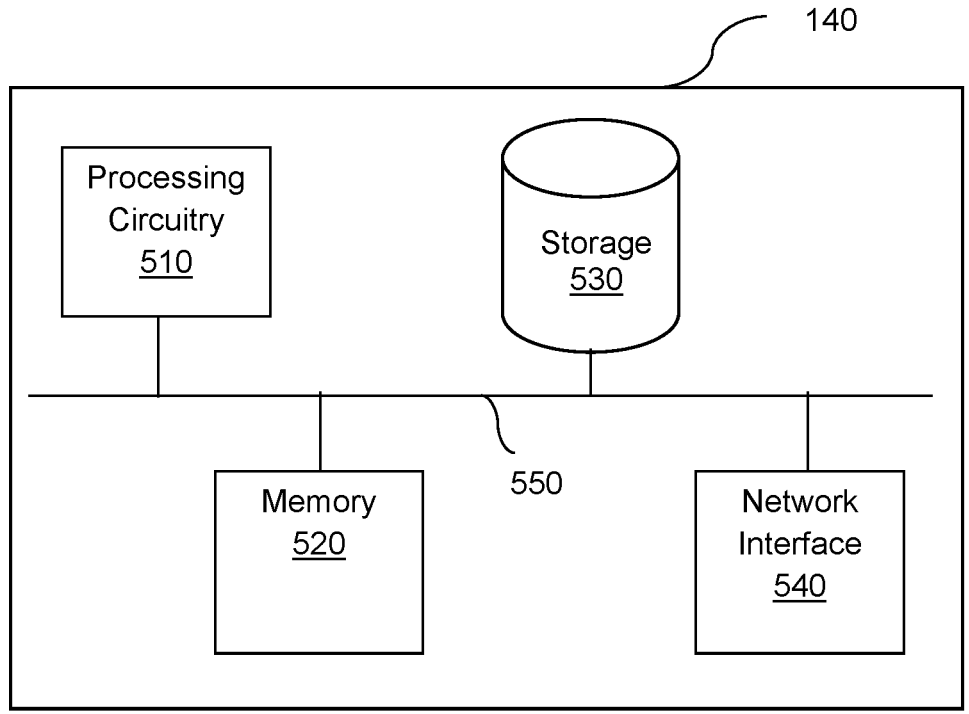
FIG. 5 is a schematic diagram of a device attribute identifier according to an embodiment.

FIG. 5 is an example schematic diagram of a device attribute identifier 140 according to an embodiment. The device attribute identifier 140 includes a processing circuitry 510 coupled to a memory 520, a storage 530, and a network interface 540. In an embodiment, the components of the device attribute identifier 140 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the device attribute identifier 140 to communicate with, for example, the data sources 130, FIG. 1.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for determining device attributes based on protocol string conventions, comprising:

applying at least one machine learning model to an application data set extracted based on at least one first pair of strings, each first pair of strings including a protocol string and a key string indicated in respective fields of communications session data corresponding to a device, wherein each of the at least one machine learning model is trained based on a training data set including a plurality of second pairs of strings and a plurality of device attribute labels, wherein each device attribute label corresponds to one of the second pairs of strings, wherein each of the at least one machine learning model is configured to output a predicted device attribute for the device based on the first pair of strings;

determining at least one device attribute of the device when a threshold number of the at least one machine learning model output probabilities is above a respective confidence threshold for the at least one device attribute, wherein each of the at least one machine learning model has a respective confidence threshold calculated for each device attribute label, wherein the at least one device attribute is only determined when no conflicting predictions exist above their respective confidence thresholds;

monitoring activity of the device with respect to at least one policy corresponding to the identified device attribute of the device; and performing at least one mitigation action based on the monitored activity.

2. The method of claim 1, wherein the at least one machine learning model is an ensemble including a plurality of machine learning models, wherein the device attribute is identified based on the output of each of the plurality of machine learning models.

3. The method of claim 2, wherein the identified device attribute is a device attribute which was output by at least a threshold number of machine learning models of the ensemble.

4. The method of claim 1, further comprising:

extracting the application data set by generating a plurality of substrings from each string of the first pair of strings, wherein each of the at least one machine learning model is applied to each of the plurality of substrings.

5. The method of claim 4, wherein each of the at least one machine learning model is a neural network including an inner product layer, each inner product layer having a plurality of nodes representing characters encoded according to a respective encoding standard.

6. The method of claim 5, wherein each neural network further includes a convolutional layer, wherein the convolutional layer of each neural network includes a plurality of filters, wherein each filter of each convolutional layer is applied to each of the plurality of substrings and outputs a value representing a degree of similarity between the filter and each applied substring.

7. The method of claim 6, wherein each neural network further includes a fully connected layer, wherein the fully connected layer of each neural network is configured to output a probability vector including a plurality of entries indicating a probability that the device has a device attribute corresponding to each of the plurality of device attribute labels.

8. The method of claim 1, further comprising:

determining that the device has a disallowed device attribute based on the identified device attribute; and blocking the device having the disallowed device attribute from accessing at least one network environment.

9. A non-transitory computer readable medium having stored thereon instructions for causing a processing circuitry to execute a process, the process comprising:

applying at least one machine learning model to an application data set extracted based on at least one first pair of strings, each first pair of strings including a protocol string and a key string indicated in respective fields of communications session data corresponding to a device, wherein each of the at least one machine learning model is trained based on a training data set including a plurality of second pairs of strings and a plurality of device attribute labels, wherein each device attribute label corresponds to one of the second pairs of strings, wherein each of the at least one machine learning model is configured to output a predicted device attribute for the device based on the first pair of strings;

determining at least one device attribute of the device when a threshold number of the at least one machine learning model output probabilities is above a respective confidence threshold for the at least one device attribute, wherein each of the at least one machine learning model has a respective confidence threshold calculated for each device attribute label, wherein the at least one device attribute is only determined when no conflicting predictions exist above their respective confidence thresholds;

monitoring activity of the device with respect to at least one policy corresponding to the identified device attribute of the device; and performing at least one mitigation action based on the monitored activity.

10. A system for identifying device attributes based on string field conventions, comprising:

a processing circuitry; and a memory, the memory containing instructions that, when executed by the processing circuitry, configure the system to:

apply at least one machine learning model to an application data set extracted based on at least one first pair of strings, each first pair of strings including a protocol string and a key string indicated in respective fields of communications session data corresponding to a device, wherein each of the at least one machine learning model is trained based on a training data set including a plurality of second pairs of strings and a plurality of device attribute labels, wherein each device attribute label corresponds to one of the second pairs of strings, wherein each of the at least one machine learning model is configured to output a predicted device attribute for the device based on the first pair of strings;

determine at least one device attribute of the device when a threshold number of the at least one machine learning model output probabilities is above a respective confidence threshold for the at least one device attribute, wherein each of the at least one machine learning model has a respective confidence threshold calculated for each device attribute label, wherein the at least one device attribute is only determined when no conflicting predictions exist above their respective confidence thresholds;

monitor activity of the device with respect to at least one policy corresponding to the identified device attribute of the device; and perform at least one mitigation action based on the monitored activity.

11. The system of claim 10, wherein the at least one machine learning model is an ensemble including a plurality of machine learning models, wherein the device attribute is identified based on the output of each of the plurality of machine learning models.

12. The system of claim 11, wherein the identified device attribute is device attribute which was output by at least a threshold number of machine learning models of the ensemble.

13. The system of claim 10, wherein the system is further configured to:

extract the application data set by generating a plurality of substrings from each string of the first pair of strings, wherein each of the at least one machine learning model is applied to each of the plurality of substrings.

14. The system of claim 13, wherein each of the at least one machine learning model is a neural network including an inner product layer, each inner product layer having a plurality of nodes representing characters encoded according to a respective encoding standard.

15. The system of claim 14, wherein each neural network further includes a convolutional layer, wherein the convolutional layer of each neural network includes a plurality of filters, wherein each filter of each convolutional layer is applied to each of the plurality of substrings and outputs a value representing a degree of similarity between the filter and each applied substring.

16. The system of claim 15, wherein each neural network further includes a fully connected layer, wherein the fully connected layer of each neural network is configured to output a probability vector including a plurality of entries indicating a probability that the device has a device attribute corresponding to each of the plurality of device attribute labels.

17. The system of claim 10, wherein the system is further configured to:

determine that the device has a disallowed device attribute based on the identified device attribute; and block the device having the disallowed device attribute from accessing at least one network environment.

* * * * *